(12) United States Patent
Teng et al.

(10) Patent No.: US 6,893,246 B2
(45) Date of Patent: May 17, 2005

(54) CLAMPING DEVICE FOR INJECTION-MOLDING MACHINE

(75) Inventors: Ming-Chang Teng, Hsinchu (TW); Hsiang-Nien Chung, Hsinchu (TW); Wen-Hung Feng, Hsinchu (TW); Ming-Chi Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 180 days.

(21) Appl. No.: 10/318,170

(22) Filed: Dec. 13, 2002

(65) Prior Publication Data
US 2004/0037917 A1 Feb. 26, 2004

(30) Foreign Application Priority Data
Aug. 22, 2002 (TW) ...................................... 91213084 U (51) Int. Cl.$^7$ .............................................. B29C 45/64
(52) U.S. Cl. ...................... 425/214; 425/590; 425/595; 425/451.7
(58) Field of Search .................................. 425/190, 214, 425/556, 589, 590, 595, 451.7

(56) References Cited

U.S. PATENT DOCUMENTS 2,484,344 A * 10/1949 Hiller et al. ................. 425/214
3,704,973 A * 12/1972 Renfrew et al. ............. 425/214
6,254,371 B1 * 7/2001 McNally et al. ............. 425/214

* cited by examiner

Primary Examiner—James P. Mackey
(74) Attorney, Agent, or Firm—Rabin & Berdo, P.C.

(57) ABSTRACT

A clamping device for injection-molding machine includes a high-speed screw rod unit having a nut element screwed thereto and a movable mold holder connected to a front end thereof, a clamping screw rod unit screwed to a rear end of the nut element and connected to a transmission assembly, a pre-pressing unit adjustably tightened to the clamping screw rod unit for the latter to generate a pre-pressure against the nut element, and a braking unit adapted to brake the nut element. When the nut element is not braked, the high-speed screw rod unit is driven by the transmission assembly to move forward at high speed for closing mold. And, when the nut element is braked and the clamping screw rod unit is driven by the transmission assembly to rotate relative to the nut element, the nut element is linearly pushed forward to generate a high-pressure clamping force during closing mold.

19 Claims, 6 Drawing Sheets

CLAMPING DEVICE FOR INJECTION-MOLDING MACHINE

BACKGROUND OF THE INVENTION

The present invention relates to a clamping device for injection-molding machine, and more particularly to a clamping device for injection-molding machine including a high-speed screw rod unit, a lead of which can be changed to enable closing of mold at a high speed and producing of a high-pressure clamping force for closing mold.

The clamping device is one of many critical parts in an injection-molding machine to ensure reliable closing of mold. Since molten material is supplied into a mold cavity under a extremely high pressure, it is necessary to apply a sufficient clamping force to tightly close the mold to avoid flashing, molded products with flashes, or other conditions that would adversely affect the quality of the molded products.

In closing the mold, it is desirable the clamping device is moved at a high speed to save time, and provides a sufficient clamping force at the time two mold halves of the mold contact with each other in order to tightly close the mold.

Figure 1:
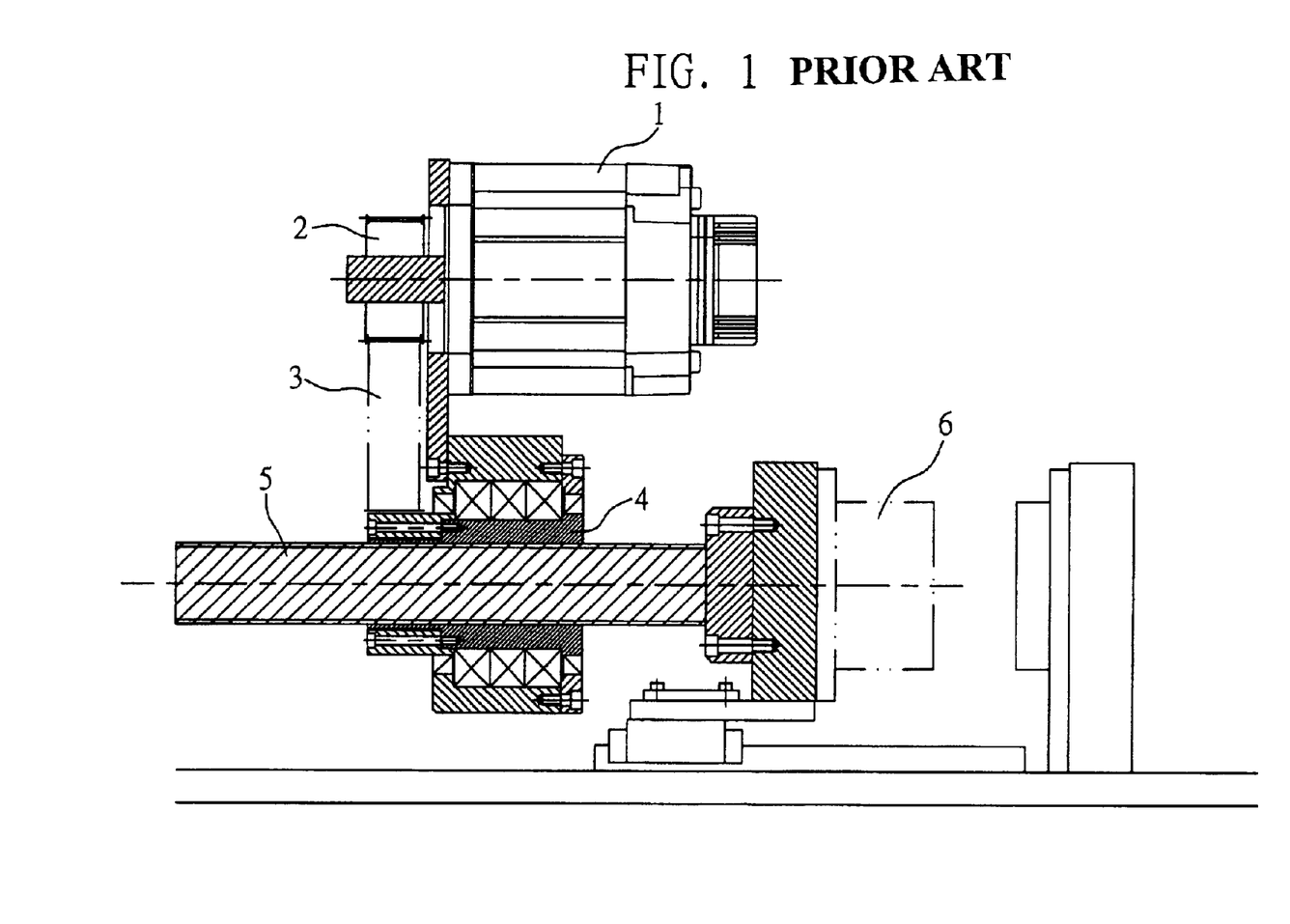

FIG. 1 shows a conventional power-driven clamping device, in which a servomotor 1 is employed to rotate a timing belt pulley 2. A dynamic force produced by the servomotor 1 is transmitted to a nut element 4 via the timing belt pulley 2 and a timing belt 3 wound around the timing belt pulley 2, so that the nut element 4 is driven to rotate a screw rod 5. A rotating motion of the screw rod 5 is converted into a linear motion, enabling the screw rod 5 to move reciprocatingly. By rotating the servomotor 1 forward or reversely, a movable mold 6 connected to the screw rod 5 is closed to or moved away from a fixed mold, respectively.

To enable movement of the movable mold 6 at a high speed, the above-described conventional clamping device has to employ a screw rod having a relatively large lead to increase the moving speed of the mold 6. However, when the servomotor 1 has a fixed power, the screw rod 5 with a large lead has a large pitch and accordingly an acting force with a small rate of amplification. This condition prevents the conventional clamping device from producing a large clamping force during closing mold. Due to the small clamping force, many problems, such as flashing, molded products with flashes or inferior quality, etc., would occur.

On the contrary, when a screw rod with a small lead is employed in the clamping device, the acting force thereof would have a relatively large rate of amplification. However, the screw rod would take more time to complete the closing of mold. That is, the time for the clamping device to complete one molding cycle is extended and the productivity of the injection-molding machine is reduced to increase the overall manufacturing cost of the molded products.

If it is desired for the conventional clamping device to close the mold at high speed and under high-pressure clamping force, it is necessary to increase the power of the servomotor, so as to supply an increased dynamic force. However, a high-power servomotor consumes extremely high power and has a big volume to result in waste of energy, increased equipment cost, and occupation of large space.

It is therefore an important and critical issue to develop a power-driven clamping device for injection molding machine that enables closing of mold at high speed and under high-pressure clamping force with a low-power driving source.

SUMMARY OF THE INVENTION

A primary object of the present invention is to provide a clamping device that uses only one single low-power driving source to enable closing of mold at high speed and under high-pressure clamping force in an injection-molding machine.

Another object of the present invention is to provide a clamping device in which the lead of a screw rod can be varied, so that the screw rod moving in large lead enables closing of mold at high speed, and the screw rod moving in small lead enables production of high-pressure clamping force in an injection-molding machine.

To achieve the above and other objects, the clamping device for injection-molding machine according to the present invention mainly includes a movable mold holder, a guiding assembly, a high-speed screw rod unit, a clamping screw rod unit, a transmission assembly, a pre-pressing unit, and a braking unit.

The movable mold holder is connected at a first side to a first mold half. The guiding assembly is mounted on a bed of the injection-molding machine for guiding the movable mold holder fixedly connected thereto to move in linear motion. The high-speed screw rod unit may be a large-lead screw rod capable of converting a rotating motion thereof into a high-speed linear motion. A front end of the high-speed screw rod unit is connected to a second side of the movable mold holder opposite to the first side by means of screws. A nut element being provided at a rear outer end with external threads is screwed to an outer circumferential surface of the high-speed screw rod unit, so that the high-speed screw rod unit extends through the nut element to mesh with internal threads thereof. When the nut element is rotated, it causes the high-speed screw rod unit to move linearly and rapidly in large lead. And, when the high-speed screw rod unit is driven to move, the movable mold holder and the first mold half are pushed forward at high speed for closing mold.

The clamping screw rod unit is a hollow tubular member adapted to mount around the high-speed screw rod unit and coaxially screw to the nut element to mesh with the external threads thereof. The clamping screw rod unit is coupled to a bearing in a bearing block mounted on the bed, and has an end connected to a driving source located above the bearing block. A driving force produced by the driving source is transmitted via the transmission assembly to rotate the clamping screw rod unit, which in turn causes the high-speed screw rod unit to move in reciprocating motion.

When it is desired for the high-speed screw rod unit to move in large lead, the driving force produced by the driving source is transmitted to the clamping screw rod unit for the same to rotate the nut element, so that the internal threads of the rotating nut element bring the high-speed screw rod unit to move rapidly in linear motion.

The pre-pressing unit is adjustably tightened to the clamping screw rod unit for the latter to generate a pre-pressure against the nut element. The braking unit is fixedly mounted on the bed in the vicinity of the high-speed screw rod unit to brake the nut element, so as to restrict the high-speed screw rod unit from rotating motion at high speed while allow the clamping screw rod unit to rotate relative to the nut element.

When the braking unit brakes the nut element, and the driving force produced by the driving source is large enough to drive the clamping screw rod unit to rotate in small lead relative to the rear outer end of the braked nut element, the nut element is driven to move forward the high-speed screw rod unit with a large push force to close the mold.

Thus, when the braking unit is actuated to brake the nut element, a driving torsion produced by the driving source is continuously increased to concentrate on the clamping screw rod unit. When the driving torsion becomes larger than the pre-pressure produced by the clamping screw rod unit against the nut element via the pre-pressing unit, the clamping screw rod unit starts rotating relative to the rear outer end of the nut element in small lead for the latter to generate a high-pressure linear push that drives the movable mold holder connected to the front end of the high-speed screw rod unit to move forward under a high-pressure clamping force during closing mold.

To open the mold, the driving source is caused to rotate reversely for the clamping screw rod unit to release the clamping force applied to the mold. Meanwhile, the nut element is released from the braking unit, so that the driving force from the driving source is transmitted to the high-speed screw rod unit for the same to rotate and move the movable mold holder and the first mold half backward at high speed to complete the opening of mold.

The pre-pressing unit includes a pressure-adjusting ring properly spaced from the clamping screw rod unit, and a plurality of screws axially extended through the pressure-adjusting ring into the clamping screw rod unit.

Thus, the high-speed screw rod unit, which is a large-lead screw rod having a large pitch, would move rapidly at an initial stage in the course of closing mold to enter the state of closing mold without wasting valuable time. At this point, since the braking unit is not actuated, and the clamping screw rod unit applies a pre-pressure to the nut element via the pre-pressing unit to rotate along with the nut element instead of rotating alone, the high-speed screw rod unit is allowed to move forward at high speed.

The high-speed screw rod unit having large pitch would have an acting force with low rate of amplification, preventing the high-speed screw rod unit from producing a required clamping force during closing mold. By actuating the braking unit at this point to brake the nut element, the driving torsion produced by the driving source is concentrated on the clamping screw rod unit and continuously increased to finally become larger than the pre-pressure applied by the clamping screw rod unit to the nut element, and thereby causes the clamping screw rod unit to rotate relative to the braked nut element.

The clamping screw rod unit is coaxially screwed to the rear outer end of the nut element, and is a small-lead screw rod to have a small pitch. By actuating the braking unit when the high-speed screw rod unit is moved close to an end of a travel of closing mold, the clamping screw rod unit is driven by the driving source to rotate relative to the brake nut element and thereby changes a large-lead driving torsion of the high-speed screw rod unit into a small-lead high-pressure linear push. That is, the output of the driving source is amplified to produce a high-pressure clamping force. Therefore, only one single low-power driving source is enough to produce both high-speed motion and high-pressure clamping force.

After a molding material injected into the mold by an injecting unit of the injection-molding machine is cooled and set, the driving source is caused to rotate reversely to enable opening of mold. The molded product is pushed out of the mold by a push means mounted in the high-speed screw rod unit.

The driving source may be a servomotor; and the transmission assembly may include a driving pulley, a belt pulley, and a transmission member. The transmission member may be a timing belt, a chain, a gear, or any other equivalent element capable of transmitting a dynamic force.

To open the mold, the nut element is released from the braking unit, and the driving source is caused to rotate reversely for the clamping screw rod unit to release the mold from the high-pressure clamping force, so that the high-speed screw rod unit can move the movable mold holder and the first mold half backward to open the mold at high speed.

The pre-pressing unit may be a spring, a cylinder, a belt, a fastening loop, a compressible element, or any other equivalent element or means adapted to adjust a pressure applied to the clamping screw rod unit for the latter to generate an adjustable pre-pressure against the nut element without getting the nut element stuck.

The pre-pressing unit may be mounted and oriented in an axial, radial, or any other direction relative to the clamping screw rod unit, so long as it may cause the clamping screw rod unit to generate the required pre-pressure against the nut element.

Moreover, the braking unit may be, for example, an air cylinder, an oil cylinder, an electromagnetic actuator, or any other unit that provides equivalent effect to brake the nut element when the small-lead clamping screw rod unit is to be actuate during closing mold to generate a high-pressure clamping force, and to release the nut element during opening mold for the high-speed screw rod unit to move the movable mold holder and the first mold half backward in large lead and at high speed.

With the clamping device of the present invention, only one single low-power driving source is needed to change the lead of the high-speed clamping rod unit, so that when the high-speed screw rod unit is moved in large lead, the closing of mold can be performed at a high speed, and when the high-speed screw rod unit is moved in small lead, a high-pressure clamping force is produced for closing mold.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 schematically shows the structure of a conventional clamping device for injection-molding machine.

DETAILED DESCRIPTION OF THE PREFERRED EMBODIMENTS

An embodiment of the clamping device for injection-molding machine according to the present invention will now be described with reference to FIGS. 2 to 6. The clamping device for injection-molding machine according to the present invention mainly includes a movable mold holder 11, a guiding assembly 12, a high-speed screw rod unit 13, a clamping screw rod unit 15, a transmission assembly 231, a pre-pressing unit 17, and a braking unit 19.

For the purpose of simplification and clarity, only parts and elements of the injection-molding machine that are related to the clamping device are shown in the drawings and denoted with reference numerals. Since the injection-molding machine is a known art, it is not illustrated in details in the drawings.

Figure 2:
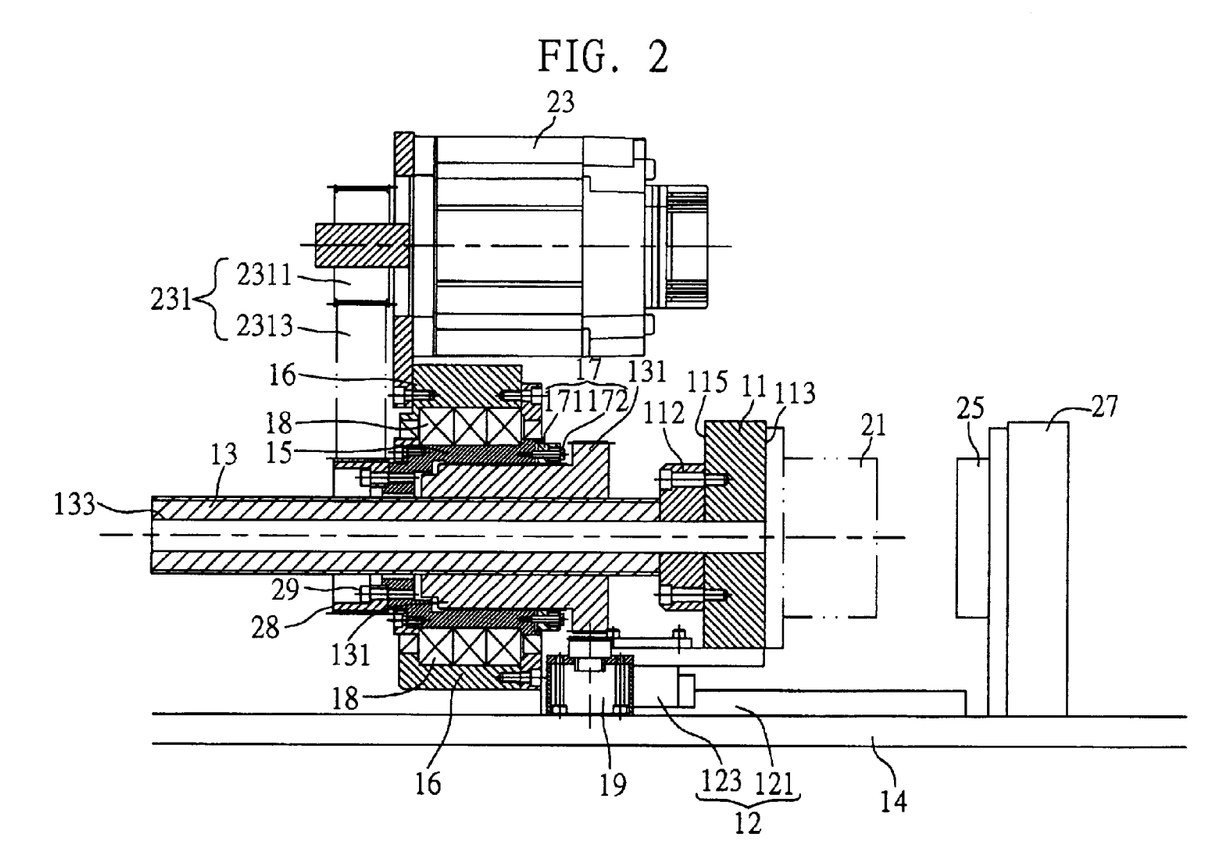
FIG. 2 is a sectional view of a clamping device for injection-molding machine according to an embodiment of the present invention, wherein a braking unit thereof is not actuated for the clamping device to move at high speed during closing mold.
Figure 3:
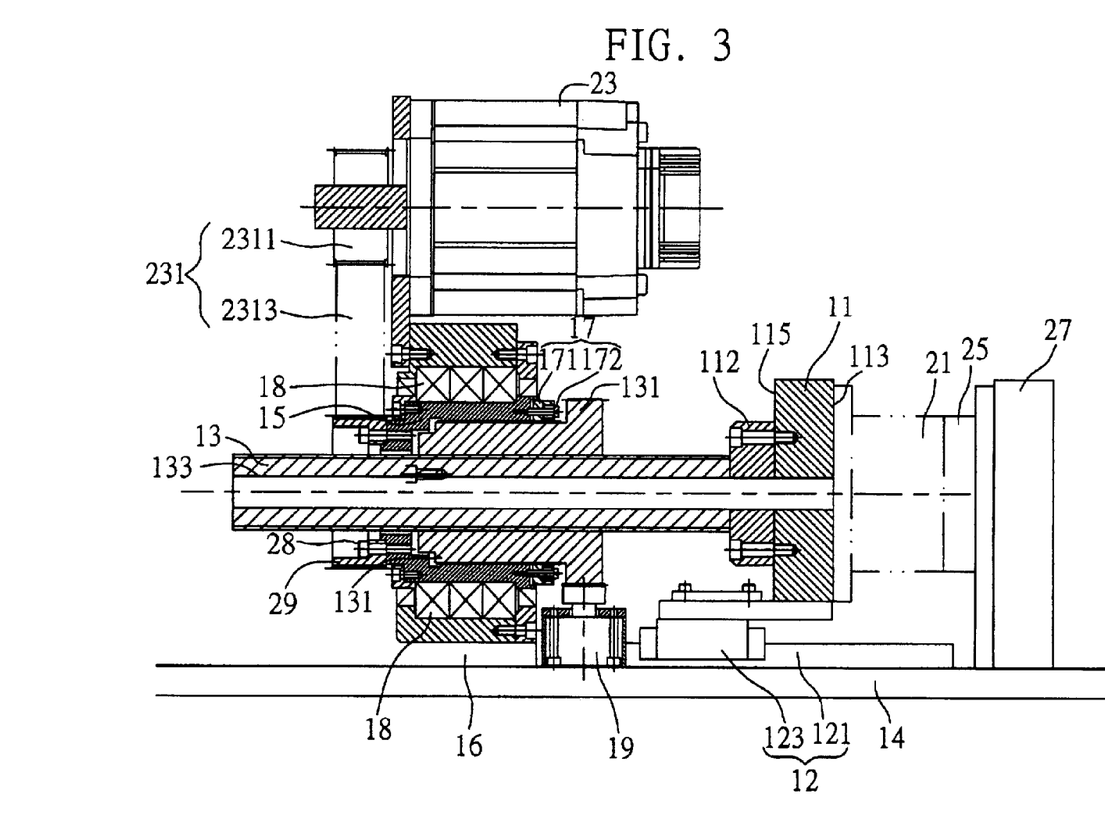
FIG. 3 is another sectional view of the clamping device for injection-molding machine of FIG. 2, wherein the braking unit is actuated during closing mold.
Figure 4:
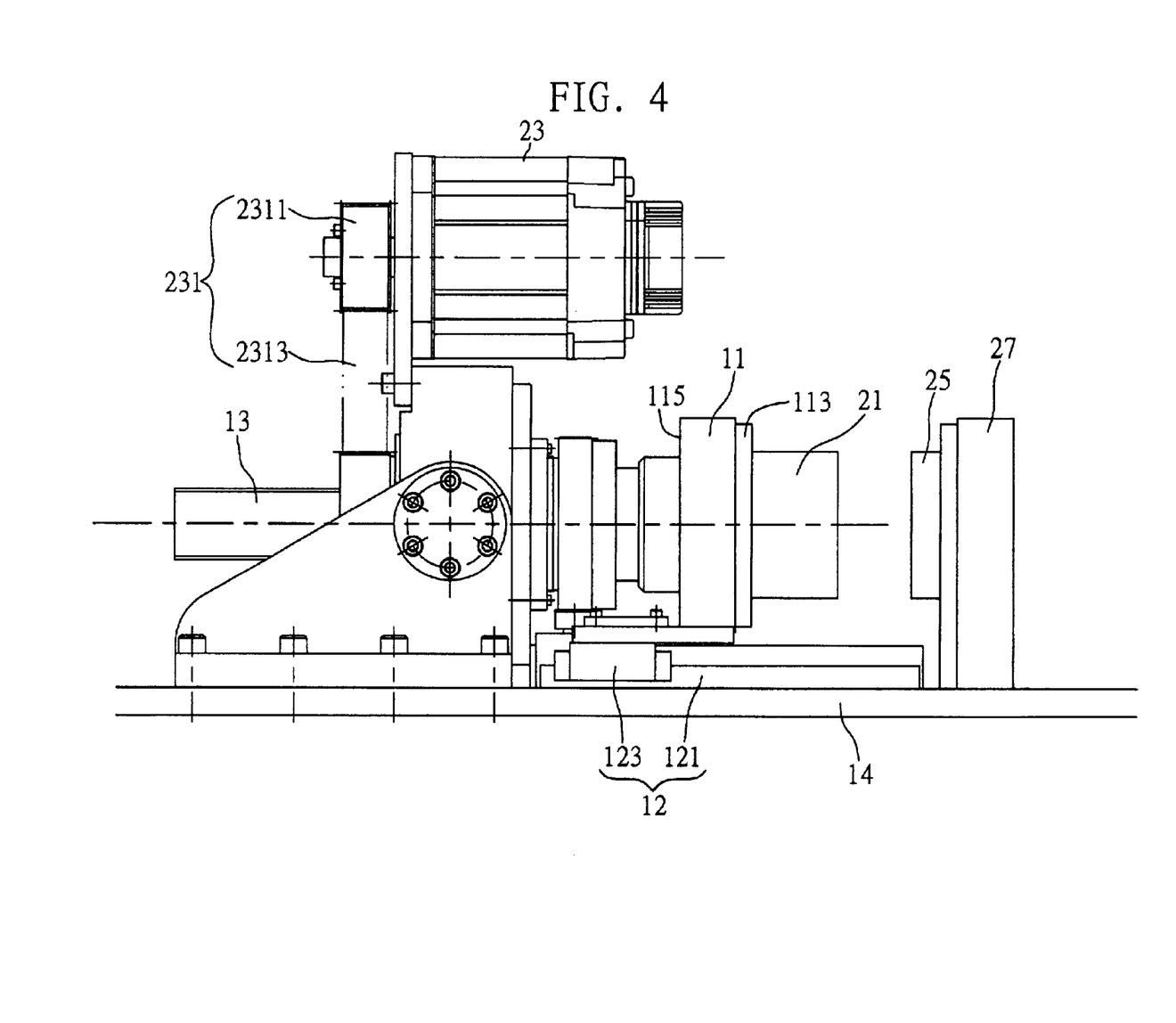
FIG. 4 is a front elevation of the clamping device for injection-molding machine of FIG. 2.
Figure 5:
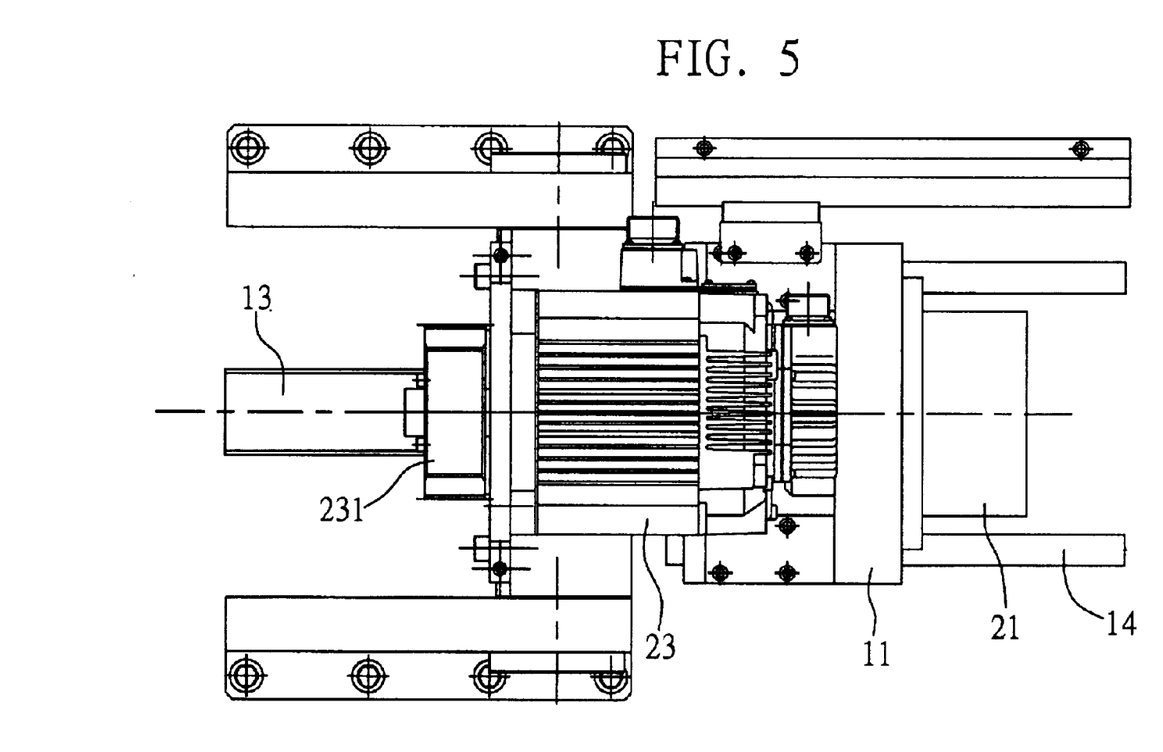
FIG. 5 is a top plan view of the clamping device for injection-molding machine of FIG. 2.
Figure 6:
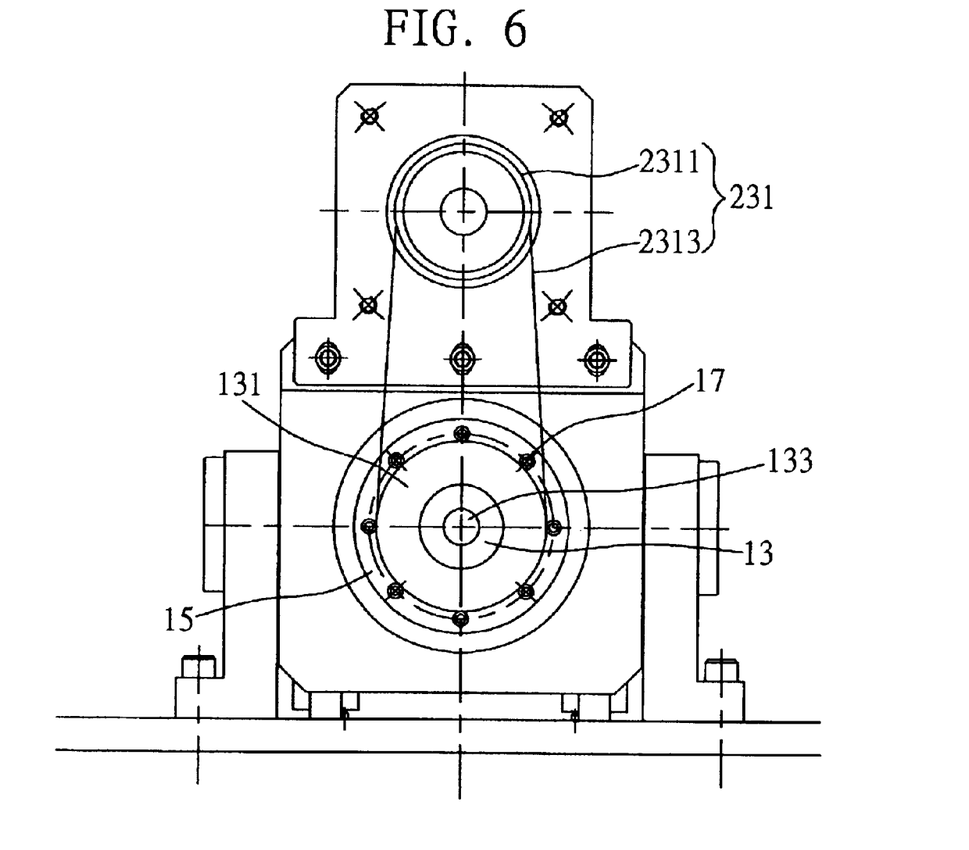
FIG. 6 is a side view of the clamping device for injection-molding machine of FIG. 2.

Please refer to FIGS. 2 to 4. The movable mold holder 11 is connected at a first side 113 to a first mold half 21. The guiding assembly 12 is mounted on a bed 14 of the injection-molding machine and includes a slide rail 121 and a sliding seat 123 for guiding the movable mold holder 11 fixedly connected to the sliding seat 123 to move in linear motion. The high-speed screw rod unit 13 may be a large-lead screw rod capable of converting a rotating motion thereof into a high-speed linear motion. A front end of the high-speed screw rod unit 13 is connected to a second side 115 of the movable mold holder 11 opposite to the first side 113 by means of screws 112. A nut element 131 being provided at a rear outer end with external threads (not shown) is screwed to an outer circumferential surface of the high-speed screw rod unit 13. The high-speed screw rod unit 13 may be driven to move the movable mold holder 11 and the first mold half 21 connected thereto at a high speed for the purpose of closing mold.

The clamping screw rod unit 15 is a hollow tubular member adapted to mount around the high-speed screw rod unit 13 to serve as a small-lead screw rod by coaxially screwing it to the nut element 131 to mesh with the external threads of the nut element 131. The clamping screw rod unit 15 is coupled to a bearing 18 in a bearing block 16 mounted on the bed 14, and has an end connected to a driving source 23, such as a servomotor, located above the bearing block 16. A driving force produced by the driving source 23 is transmitted via the clamping screw rod unit 15 to rotate the nut element 131 and thereby drives the high-speed screw rod unit 13 to move in reciprocating motion.

The clamping screw rod unit 15 is provided with internal threads (not shown) to mesh with the external threads of the nut element 131. The internal and the external threads of the clamping screw rod unit 15 and the nut element 131 may be of any shape, so long as the internal threads of the element nut 131 could mesh with the high-speed screw rod unit 13 and produce a large lead, and the external threads of the nut element 131 could mesh with the internal threads of the clamping screw rod unit 15 and produce a small lead.

Please refer to FIG. 2. The transmission assembly 231 includes a driving pulley 2311, a belt pulley 28, and a transmission member 2313. The dynamic force produced by the driving source 23 is output to the driving pulley 2311 to rotate the same. The driving pulley 2311 in rotating brings the transmission member 2313 to move and thereby rotate the belt pulley 28. Since the belt pulley 28 is fixed to the clamping screw rod unit 15 by means of screws 29, the dynamic force produced by the driving source 23 is finally transmitted via the transmission assembly 231 to the clamping screw rod unit 15 to rotate the latter. The transmission member 2313 may be a timing belt. As mentioned above, the clamping screw rod unit 15 is coaxially mounted around the nut element 131 and can rotate at a high speed. Therefore, the dynamic force produced by the driving source 23 transmitted to the clamping screw rod unit 15 can be further transmitted via the nut element 131 to the high-speed screw rod unit 13 for the same to move in reciprocating motion, as shown in FIGS. 2 and 3.

The pre-pressing unit 17 is adjustably mounted to the clamping screw rod unit 15, such that the clamping screw rod unit 15 generates a pre-pressure against the nut element 131. In the illustrated embodiment of the present invention, the pre-pressing unit 17 includes a pressure-adjusting ring 171 and a plurality of adjusting screws 172. The adjusting screws 172 are extended through the pressure-adjusting ring 171 to axially tighten the latter to the clamping screw rod unit 15. A tightness by which the adjusting screws 172 are tightened to the pressure-adjusting ring 171 is adjustable. When the tightness is increased, the adjusting screws 172 would pull the clamping screw rod unit 15 toward the pre-pressing unit 17 to therefore apply an increased pre-pressure to the nut element 131. On the contrary, when the tightness is reduced, the clamping screw rod unit 15 applies a reduced pre-pressure to the nut element 131. The pre-pressing unit 17 may be adjusted for producing a suitable pre-pressure depending on actual needs of the clamping device.

The pre-pressing unit 17 may be otherwise a belt, a fastening loop, or other equivalent elements or means that enables production of a pre-pressure between the nut element 131 and the clamping screw rod unit 15 by applying an external force to the clamping screw rod unit 15. Moreover, it is not necessary for the pre-pressing unit 17 to have an axial location and orientation as that shown in the illustrated embodiment. On the contrary, it may be radially located and oriented, or at any other location and in any other orientation to generate equivalent pre-pressure.

The braking unit 19 may be a cylinder and is fixedly mounted on the bed 14 in the vicinity of the high-speed screw rod unit 13, as shown in FIG. 2, in order to brake the nut element 131 and thereby restrict the high-speed screw rod unit 13 from the high-speed rotating motion. When the driving source 23 produces a driving torsion larger than a pre-pressure applied by the clamping screw rod unit to the nut element through adjustment of the pre-pressing unit 17, the clamping screw rod unit 15 is driven to rotate relative to the rear outer end of the nut element 131.

When the braking unit 19 is actuated to brake the nut element 131, the driving torsion produced by the driving source 23 is continuously increased to concentrate on the clamping screw rod unit 15. When the driving torsion becomes larger than the pre-pressure produced via the pre-pressing unit 17, the clamping screw rod unit 15 starts rotating relative to the braked nut element 131 for the latter and accordingly the high-speed screw rod unit 13 meshed with the nut element 131 to generate a high-pressure linear push that enables closing of mold under a high pressure. To open the mold, the driving source 23 is caused to rotate reversely and the clamping screw rod unit 15 to release the high-pressure clamping force applied to the mold. Meanwhile, the braking unit 19 is released, so that the driving force from the driving source 23 is transmitted to the high-speed screw rod unit 13 for the same to move the movable mold holder 11 and the first mold half 21 backward at high speed to complete the opening of mold.

In other words, when the driving torsion produced by the driving source 23 is caused to concentrate on the clamping screw rod unit 15, the linear motion of the high-speed screw rod unit 13 in large lead for closing the mold at high speed is changed into a small-lead high-pressure linear motion to produce a high-pressure clamping force, as shown in FIG. 3. And, at the time the mold is to be opened, the nut element 131 is released from the braking unit 19, so that the high-speed screw rod unit 13 resumes moving in large lead and at high speed to complete the opening of mold.

Since feeding of a plastic material from a feeding barrel to an injecting unit of the injection-molding machine and then to the mold is a known art, it is not discussed and illustrated in details herein. The following is a detailed description of the manner in which the clamping device of the present invention is actuated to close and open molds.

At an initial stage in a travel of the clamping device for closing mold, as indicated by FIG. 2, the driving source 23 brings the transmission assembly 231 to rotate the clamping screw rod unit 15 and the bearing 18, which in turn transmits the driving force produced by the driving source 23 via the nut element 131 to the high-speed screw rod unit 13 for the same to continuously move the movable mold holder 11 toward a stationary mold holder 27 on which a second mold half 25 is mounted. Since the high-speed screw rod unit 13 is a large-lead screw rod having a relatively large pitch, it is able to travel rapidly for the first mold half 21 to quickly approach to the second mold half 25 that matches with the first mold half 21. At this stage, the braking unit 19 is not actuated to brake the nut element 131, and the clamping screw rod unit 15 applies a pre-pressure to the nut element 131 due to the tightened pre-pressing unit 17 and therefore firmly associates with the nut element 131 to form an integral body without moving relative to the nut element 131. This condition allows the high-speed screw rod unit 13 to maintain traveling at a high speed.

While the large-lead high-speed screw rod unit 13 keeps moving at high speed and brings the first mold half 21 to contact with the second mold half 25 in the process of closing mold, its large pitch also limits its acting force to a relative small rate of amplification. Therefore, the push produced by the high-speed screw rod unit 13 is not high enough to generate a clamping force as required. At this point, the braking unit 19 is actuated to brake the nut element 131, as indicated in FIG. 3, and thereby restricts the high-speed screw rod unit 13 from rotating and moving forward. At this point, the driving torsion produced by the driving source 23 continuously increases to concentrate on the clamping screw rod unit 15. When the driving torsion of the driving source 23 becomes larger than the pre-pressure applied by the clamping screw rod unit 15 to the nut element 131 due to the tightened pre-pressing unit 17, the clamping screw rod unit 15 is released from the state of associating with the nut element 131. At this point, the nut element 131 is braked by the braking unit 19 and does not rotate along with the clamping screw rod unit 15, but is moved forward when the clamping screw rod unit 15 rotates relative to its rear outer end.

Since the clamping screw rod unit 15 is coaxially screwed to the external threads of the nut element 131 and has small pitch, it serves as a small-lead screw rod. With the small-lead clamping screw rod unit 15, the linear moving speed of the high-speed screw rod unit 13 is largely reduced and the acting force thereof has an increased rate of amplification. That is, the clamping screw rod unit 15 changes the large lead of the high-speed screw rod unit 13 to the small lead to generate a high-pressure clamping force against the mold to be closed. In other words, when the small-lead clamping screw rod unit 15 is actuated, the driving torsion of the driving source 23 is converted into a high-pressure linear push. That is, the output of the driving source 23 is amplified to generate a high-pressure clamping force to tightly close the first mold half 21 to the second mold half 25.

Meanwhile, the injecting unit (not shown) of the injection-molding machine injects the molding material into mold cavities of the first and the second mold halves 21, 25. After the molding material becomes cooled and set in the mold, the braking unit 19 is released, and the driving source 23 is turned reversely to release the high-pressure clamping force applied to the closed mold, allowing the high-speed screw rod unit 13 to resume its large lead and move at high speed to bring the movable mold holder 11 and the first mold half 21 away from the second mold half 25 to complete the opening of mold. The high-speed screw rod unit 13 has a coaxial central hole 133 extended through the movable mold holder 11 to communicate with the first mold half 21. A push rod (not shown) may be extended through the central hole 133 to push a molded product out of the mold when the first and the second mold halves 21, 25 are opened.

The driving source 23 employed in the present invention may be a servomotor; the driving pulley 2311 may be a member corresponding to the transmission member 2313; and the transmission member 2313 may be, for example, such as a timing belt, a chain, a gear, or any other equivalent member capable of transmitting a dynamic force, so long as the dynamic force produced by the driving source 23 can be transmitted to the high-speed and the clamping screw rod units 13, 15.

Meanwhile, the pre-pressing unit 17 may be a screw, a belt, a spring, a cylinder, a compressible element, or any other equivalent element that can be adjustably tightened to the clamping screw rod unit 15 for the latter to generate an adjustable pre-pressure against the nut element 131, so that the nut element 131 is normally rotated along with the clamping screw rod unit 15. The pre-pressure applied by the clamping screw rod unit 15 against the nut element 131 may be adjusted depending on actual needs, so long as the nut element 131 does not become stuck under the pre-pressure. In brief, the pre-pressing unit 17 enables the clamping screw rod unit 15 and the nut element 131 to tightly associate with each other with an adjustable pre-pressure existing between them.

The braking unit 19 may be, for example, such as an air cylinder, an oil cylinder, an electromagnetic actuator, or any other equivalent means capable of restricting the high-speed screw rod unit 13 from high-speed rotating motion, so long as the braking unit 19 is able to brake the nut element 131 during the course of small-lead movement in the travel of closing mold to allow the driving torsion of the driving source 23 to exceed the pre-pressure generated by the clamping screw rod unit 15 and thereby actuate the same. When the small-lead clamping screw rod unit 15 is actuated in the above-described manner, the driving torsion of the driving source 23 is converted into the high-pressure linear push force to generate a high-pressure clamping force. The braking unit 19 may be released during the course of opening mold for the nut element 131 to rotate, allowing the high-speed screw rod unit 13 to resume its large-lead high-speed linear movement to bring the movable mold holder 11 and the first mold half 21 away from the second mold half 25 to complete the opening of mold.

When the clamping device of the present invention is at the stage in which the high-speed screw rod unit 13 is allowed to move in a large lead, the driving force produced by the driving source 23 is transmitted to the clamping screw rod unit 15 for the same to rotate the nut element 131, so that the high-speed screw rod unit 13 meshing with the internal threads of the nut element 131 is driven to linearly move at high speed.

Moreover, when the braking unit 19 firmly brakes the nut element 131 to prevent the same from rotating, the driving force produced by the driving source 23 drives the small-lead clamping screw rod unit 15 to move in small lead relative to the rear outer end of the unmoved nut element 131, so that the nut element 131 and the high-speed screw rod unit 13 meshed therewith are driven to linearly move in small lead and produce a large push force to close the mold.

Briefly speaking, in the clamping device for injection-molding machine according to the present invention, the pre-pressing unit 17 enables the clamping screw rod unit 15 to generate a pre-pressure against the nut element 131; the high-speed screw rod unit 13 may be driven by the driving source to move forward the movable mold holder 11 at high speed when the braking unit 19 is not actuated to clamp the nut element 131; the braking unit 19 may be actuated to clamp the nut element 131 during the closing of mold, so that the driving torsion produced by the driving source 23 can be concentrated on the clamping screw rod unit 15; the clamping screw rod unit 15 is actuated when the driving torsion of the driving source 23 becomes larger than the pre-pressure generated by the clamping screw rod unit 15 against the nut element 131; and the actuated clamping screw rod unit 15 converts the driving torsion of the driving source 23 into a high-pressure linear push force and thereby changes the large lead of the high-speed screw rod unit 13 to the small lead for closing the mold at a high-speed and under a high-pressure clamping force.

With the clamping device for injection-molding machine of the present invention, only one single low-power driving source is needed. By changing the lead of the same one screw rod at different operating stage of the clamping device, the large lead enables closing mold at high speed and the small lead enables production of high-pressure clamping force at the time of closing mold. The problems resulted from insufficient clamping force during closing mold, such as flashing, molded products with flashes, or other quality problems, are therefore avoided to reduce the manufacturing cost of the molded products. Meanwhile, costs and spaces for mounting a large-size clamping device can be saved, and power consumption in injection molding is reduced.

The present invention has been described with a preferred embodiment thereof and it is understood that many changes and modifications in the described embodiment can be carried out without departing from the scope and the spirit of the invention as defined by the appended claims.

What is claimed is:

1. A clamping device for an injection-molding machine, comprising:
    a movable mold holder having a first side, to which a first mold half is connected;
    a guiding assembly being mounted on a bed of said injection-molding machine for guiding said movable mold holder mounted thereon to move in linear motion;
    a first screw rod unit being fixedly connected at an end to a second side of said movable mold holder opposite to said first side and adapted to mesh with internal threads of a nut element for said nut element to screw thereto, such that when said nut element is rotated, said first screw rod unit is brought to move in linear motion in a first lead; and said nut element being provided at a rear outer end facing away from said movable mold holder with external threads;
    a clamping screw rod unit being screwed to said nut element to mesh with said external threads of said nut element and thereby rotating said nut element for said first screw rod unit meshed with said nut element to move in reciprocating motion;
    a pre-pressing unit being adjustably tightened to said clamping screw rod unit for the latter to generate a pre-pressure against said nut element;
    a transmission assembly including a driving source, a driving force produced by which is transmitted to said clamping screw rod unit to rotate the same; and
    a braking unit being fixedly mounted on said bed of said injection-molding machine in the vicinity of said first screw rod unit for braking said nut element;
    whereby when said braking unit is actuated to brake said nut element, a driving torsion produced by said driving source continuously increases to concentrate on said clamping screw rod unit; and when said driving torsion becomes larger than said pre-pressure generated by said clamping screw rod unit against said nut element, said clamping screw rod unit is caused to rotate relative to the rear outer end of said nut element in a second lead and thereby generates a linear push force to drive forward said brake nut element, said first screw rod unit meshed with said nut element, and said movable mold holder connected to a front end of said first screw rod unit, enabling closing of mold under a clamping force; and when said driving source is rotated reversely to release said closed mold from said clamping force produced by said clamping screw rod unit and said first screw rod unit and said braking unit is caused to release said nut element, said driving torsion produced by said driving source is transmitted to said first screw rod unit for the same to move backward said movable mold holder and said first mold half connected thereto to complete opening of mold, and wherein the first lead is larger than the second lead.

2. The clamping device for the injection-molding machine as claimed in claim 1, wherein said guiding assembly includes a slide rail and a sliding seat.

3. The clamping device for the injection molding machine as claimed in claim 1, wherein said first screw rod unit is a screw rod having the first lead.

4. The clamping device for the injection-molding machine as claimed in claim 1, wherein said driving source is a servomotor.

5. The clamping device for the injection-molding machine as claimed in claim 1, wherein said transmission assembly further includes a driving pulley, a belt pulley, and a transmission member.

6. The clamping device for the injection-molding machine as claimed in claim 5, wherein said transmission member is selected from the group consisting of a timing belt, a chain, and a gear.

7. The clamping device for the injection-molding machine as claimed in claim 5, wherein said belt pulley is fixedly connected to said clamping screw rod unit.

8. The clamping device the for injection molding machine as claimed in claim 1, wherein said clamping screw rod unit has the second lead.

9. The clamping device for the injection-molding machine as claimed in claim 1, wherein said internal threads of said nut element have a pitch larger than that of said external threads of said nut element.

10. The clamping device for the injection-molding machine as claimed in claim 1, wherein said pre-pressing unit includes a pressure adjusting ring and at least one adjusting screw.

11. The clamping device for the injection-molding machine as claimed in claim 1, wherein said braking unit is selected from the group consisting of an air cylinder, an oil cylinder, and an electromagnetic actuator.

12. The clamping device for the injection-molding machine as claimed in claim 1, wherein said clamping screw rod unit is associated with a bearing mounted in a bearing block.

13. The clamping device for the injection-molding machine as claimed in claim 5, wherein said belt pulley of said transmission assembly is fixedly connected to said clamping screw rod unit by means of screws.

14. The clamping device for the injection molding machine as claimed in claim 1, wherein said first screw rod unit is a hollow tubular member.

15. The clamping device for the injection molding machine as claimed in claim 14, wherein said hollow tubular member of said first screw rod unit has a push means provided therein for generating the pre-pressure against said nut element.

16. The clamping device for the injection molding machine as claimed in claim 8, comprising means for pushing said nut element forward when said clamping screw rod unit is rotated relative to the rear outer end of said nut element in a braked state.

17. The clamping device for the injection molding machine as claimed in claim 1, comprising means for said clamping screw rod unit to drive said nut element to rotate, and for said internal threads of said nut element to drive the first screw rod unit to move in linear motion when said first screw rod unit is moving in the first lead.

18. The clamping device for the injection molding machine as claimed in claim 1, comprising means for said nut element to be braked by said braking unit to move said first screw rod unit forward with a push force to close mold when said driving force produced by said driving source is large enough to drive said clamping screw rod unit to rotate in the second lead relative to the rear outer end of said brake nut element.

19. The clamping device for the injection-molding machine as claimed in claim 1, wherein said clamping screw rod unit is coaxially screwed to said nut element to mesh with said external threads of said nut element.

* * * * *